United States Patent
Stevens et al.

(10) Patent No.: US 6,365,535 B1
(45) Date of Patent: Apr. 2, 2002

(54) CERAMIC COMPOSITION HAVING HIGH ADSORPTIVE CAPACITY FOR OXYGEN AT ELEVATED TEMPERATURE

(75) Inventors: Ward C. Stevens, New Fairfield; Delwyn Cummings, Meriden; Philip Chen, Bethel, all of CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/433,610

(22) Filed: Nov. 2, 1999

(51) Int. Cl.$^7$ .............................................. C04B 35/50
(52) U.S. Cl. ....................... 501/152; 501/123; 423/263; 423/594; 423/593
(58) Field of Search ................................ 501/123, 152; 502/303, 302, 328, 325, 354, 525, 331, 338; 423/263, 594, 593

(56) References Cited

U.S. PATENT DOCUMENTS

| | | | |
|---|---|---|---|
| 3,678,107 A | * 7/1972 | Yanemitsu et al. | 260/531 R |
| 4,045,375 A | * 8/1977 | Komatu | 502/525 |
| 4,601,883 A | * 7/1986 | Sekido et al. | 502/303 |
| 4,832,818 A | * 5/1989 | Sekido et al. | 204/412 |
| 5,021,137 A | 6/1991 | Joshi | 204/242 |
| 5,252,314 A | * 10/1993 | DeGuire et al. | 423/593 |
| 5,273,628 A | * 12/1993 | Liu et al. | 501/152 |
| 5,302,258 A | 4/1994 | Renlund et al. | 204/129 |
| 5,338,623 A | 8/1994 | Nachlas et al. | 429/31 |
| 5,378,345 A | 1/1995 | Taylor et al. | 204/421 |
| 5,385,874 A | 1/1995 | Renlund et al. | 501/103 |
| 5,399,246 A | 3/1995 | Joshi | 204/130 |

FOREIGN PATENT DOCUMENTS

| JP | 63-158131 | * 7/1988 |
|---|---|---|
| JP | 4-75253 | * 3/1992 |
| JP | 62-106359 | * 5/2000 |

OTHER PUBLICATIONS

Bouwmeester et al, "Importance of the surface exchange kinetics as rate limiting step in oxygen permeation through mixed–conducting oxides", Solid State Ionics, vol. 72, pp. 185–194, 1994.*
Sammes et al, "The synthesis of La1–xSrxMnO3 at different sintering temperatures", Jour. Matl. Sci. Lett., vol. 12, pp 829–830, 1993.*
Page 617 of "General Chemistry, Principles and Modern Applications", 3rd ed., Petrucci, 1982.*
J. Goodenough, M. Feng, "A superior oxide ion electrolyte," Eur. J. Solid State Inorg. Chem. 1994, 31, 663–672.
D. Kim, "Lattice parameters, ionic conductivities, and solubility limits in fluorite–structure $MO_2$ oxide solid solutions," J. Amer. Ceram. Soc. 1989, 72, 8, 1415–1421.
H. Kruidhof, H.J.M. Bouwmeester, A.J. Burggraaf, "Importance of the surface exchange kinetics as rate limiting step in oxygen permeation through mixed conducting oxides," Solid State Ionics 1994, 72, 185–194.

(List continued on next page.)

Primary Examiner—C. Melissa Koslow
(74) Attorney, Agent, or Firm—Steven J. Hulquist; Margaret Chappius; Robert A. McLauchlan

(57) ABSTRACT

A ceramic composition having a high adsorptive capacity for oxygen at elevated temperature, including at least one of: $Bi_{2-y}Er_yO_{3-d}$; $Bi_{2-y}Y_yO_{3-d}$; $La_{1-y}Ba_yCo_{1-x}Ni_xO_{3-d}$; $La_{1-y}Sr_yCo_{1-x}Ni_xO_{3-d}$; $La_{1-y}Ca_yCo_{1-x}Ni_xO_{3-d}$; $La_{1-y}Ba_yCo_{1-x}Fe_xO_{3-d}$; $La_{1-y}Sr_yCo_{1-x}Fe_xO_{3-d}$; and $La_{1-y}Ca_yCo_{1-x}Fe_xO_{3-d}$; wherein x is from 0.2 to 0.8, y is from 0 to 1.0 and d=0.1 to 0.9. Such ceramic composition may be made using a modified Pechini synthetic procedure. The resulting ceramic composition is usefully employed as an adsorbent for separation of oxygen from an oxygen-containing feed gas mixture, e.g., in a pressure swing adsorption (PSA) process.

10 Claims, 6 Drawing Sheets

OTHER PUBLICATIONS

M. Puri, A–Q. Pham, J.F. DiCarlo, A.J. Jacobson, "oxide ion conductivity of the new Aurivillius phase," Solid State Ionics 1994, 72, 309–313.

Maria Hartmanova, Truls Norby, "Electrical conductivity and ionic transport number of YSZ and Cr–doped YSZ single crystals at 200–1000°C," Solid State Ionics 1993, 67, 5764.

M.P. Anderson, S. Ling, and T.A. Ramanarayanan, "Optimization of ionic transport through mixed conducting oxide ceramics," Solid State Ionics 1993, 59, 33–45.

A. Chakma, J. Zaman, "Inorganic membrane reactors," J. Membrane Sci. 1994, 92, 1 –28.

K. deVries, Y. Lin, H. Brinkman, A. Burggraaf, "Oxygen semipermeable solid oxide membrane composites prepared by electrochemical vapor deposition," J. Membrane Sci. 1992, 66, 211–226.

W. Wang, Y. Lin, J. Han, "oxygen permeation through thin mixed conducting solid oxide membranes," AlChE J. 1994, 40, 5, 786–798.

Julie Thomas, Kurt Kendall, Hans–Conrad zur Loye, "Oxygen ion conductivity in a new class of layered bismuth oxides," Solid State Ionics 1994, 70/71, 221–224.

J. Baumard, B. Cales, "Mixed conductions and defect structure of $ZrO_2$–$CeO_2Y_2O_3$ solid solutions," J. Electrochem- .Soc. 1984, 131, 2407–2412.

Stuart Adler et al., "Local structure and oxide–ion motion in defective perovskites, "Solid State Ionics 1994, 68, 193–211.

W. Moser, A. Dixon, Y. Ma, "Waste reduction and recovery using o2–permeable membrane reactors," Ind. Eng. Chem. Res. 1994, 33, 3015–3024.

G. Versteeg, G. Saracco, W. van Swaaij, "Current hurdles to the success of high temperature membrane reactors," J. Membrane Sci. 1994, 95, 105–123.

* cited by examiner

CERAMIC COMPOSITION HAVING HIGH ADSORPTIVE CAPACITY FOR OXYGEN AT ELEVATED TEMPERATURE

BACKGROUND OF THE INVENTION

1 Field of the Invention

This invention relates to a ceramic composition having high sorptive capacity for oxygen at elevated temperature. Such ceramic composition may be employed for example in an elevated temperature pressure swing adsorption system for separation of oxygen-containing feed gas mixtures.

2. Description of the Related Art

In the field of gas separation for the production of industrial gases, a variety of technologies have been employed in the art, including: cryogenic separation processes involving cooling and pressurizing a feed gas mixture to form a liquid that then undergoes distillation; chemisorption or chemical reaction removal of unwanted gas species from a feed gas mixture to yield the desired gas component as the only remaining gas-phase product; scrubbing of the feed gas mixture to remove undesired soluble components therefrom, chromatographic separation of the feed gas mixture; and physical adsorption-based processes.

The latter approach of physical adsorption-based processes includes pressure swing adsorption (PSA) in which a bed of physical adsorbent material is contacted with a feed gas mixture including one or more components for which the physical adsorbent material has sorptive affinity, to preferentially adsorb such components, while the non-adsorbed components flow out of the contacting zone containing the adsorbent material. The adsorbent material then is lowered in pressure in relation to the pressure at which the feed gas mixture is contacted with the adsorbent material, e.g., by a "blow-down" or depressurization step, or alternatively by vacuum desorption, whereby the previously sorbed gas components desorb from the adsorbent material and are discharged from the adsorbent material.

The foregoing PSA process may be carried out in a multiplicity of adsorbent beds, joined together by valved manifolds at their respective inlet ends and at their outlet ends, and coupled at the inlet manifold to a source of the feed gas mixture to be separated. In operation, the valves are operated to carry out a cyclic, repetitive process in which at least one of the beds is undergoing active processing of gas mixture, while another or others are off-line or undergoing regeneration. Thus, a first bed of a multibed PSA system may be undergoing pressurization with feed gas mixture, while a second bed undergoes depressurization and discharge of previously sorbed gas therefrom. The regeneration may entail use of a purge or displacement gas, or use of embedded heat exchange coils to aid in desorbing gas from the bed.

A wide variety of sorbent materials have been used or proposed for use in PSA systems, including zeolites, activated carbon, silica, alumina, etc. The search for new sorbent materials forms a continuing focus of the gas products industry, particularly for the production of commodity industrial gases such as oxygen, nitrogen, argon, etc.

By way of specific example, systems for the commercial production of oxygen from air by PSA or vacuum-pressure swing adsorption (VPSA) frequently use zeolites as an adsorbent. Nitrogen is more strongly adsorbed than oxygen on zeolites, so when high pressure air is placed in contact with these materials, an oxygen-rich atmosphere is left. Lowering the pressure over the adsorbent bed allows the adsorbed nitrogen to reenter the gas phase (such desorbate then may be used as a nitrogen source), and the cycle is repeated. Using vacuum in the cycle (PVSA) results in slightly better performance.

PSA and VPSA techniques alone typically deliver oxygen with a purity of 90–95%, with nitrogen and argon as the major impurities. Where this purity level is acceptable, oxygen can be generated on-site.

Oxygen, however, frequently is desired to be produced at a purity level on the order of 99+%, and this is difficult to achieve economically in commercially available PSA and VPSA systems.

Polymeric membrane processes have been suggested as a potential solution to this problem, in view of the conceptually low capital costs, small size, light weight and simple operation of membrane-based separation systems. Nonetheless, efforts to produce oxygen economically with polymeric membranes have not been successful, as a result of poor permeation selectivity in commercially available polymeric membranes. In consequence, current polymeric membrane systems are not available to produce oxygen in high purity. Single-pass membrane units deliver 35–40% oxygen. Multiple pass units can go over 90%, but are not able to economically reach the aforementioned high purity threshold of 99+%.

SUMMARY OF THE INVENTION

The present invention provides a ceramic composition having high adsorptive affinity for oxygen at elevated temperature. Such ceramic composition may be usefully employed as an adsorbent medium in a PSA system to economically and efficiently sorptively remove oxygen from an oxygen-containing feed gas mixture, and produce extremely high purity product gas due to the selectivity of the ceramic composition for oxygen.

In one aspect, the invention relates to a ceramic composition having a high adsorptive capacity for oxygen at elevated temperature, comprising a ceramic material selected from the following group:

$Bi_{2-y}Er_yO_{3-d}$;

$Bi_{2-y}Y_yO_{3-d}$;

$La_{1-y}Ba_yCo_{1-x}Ni_xO_{3-d}$;

$La_{1-y}Sr_yCo_{1-x}Ni_xO_{3-d}$;

$La_{1-y}Ca_yCo_{1-x}Ni_xO_{3-d}$;

$La_{1-y}Ba_yCo_{1-x}Fe_xO_{3-d}$;

$La_{1-y}Sr_yCo_{1-x}Fe_xO_{3-d}$; and $La_{1-y}Ca_yCo_{1-x}Fe_xO_{3-d}$;

wherein x is from 0.2 to 0.8, y is from 0 to 1.0 and d=0.1 to 0.9.

Such ceramic composition may be in a divided form, e.g., beads, spheres, rings, toroidal shapes, irregular shapes, rods, cylinders, flakes, films, cubes, polygonal geometric shapes, sheets, fibers, coils, helices, meshes, sintered porous masses, granules, pellets, tablets, powders, particulates, extrudates, cloth or web form materials, honeycomb matrix monolith, composites with other components, or comminuted or crushed forms of the foregoing conformations.

The ceramic composition may additionally be coated on a substrate, such as a support in one of the conformations mentioned in the preceding paragraph.

The ceramic composition of the invention may be utilized in a divided form in a vessel, to provide a sorptive unit that may be employed in a process system for separation of oxygen from an oxygen-containing feed gas mixture that is flowed through the vessel for contacting with the ceramic composition.

In a further aspect, the invention relates to a ceramic composition having a high adsorptive capacity for oxygen at elevated temperature, in which the composition comprises a material selected from the group consisting of:

$Bi_{1.55}Er_{0.45}O_{3-d}$;
$Bi_{1.5}Y_{0.5}O_{3-d}$;
$La_{0.6}Sr_{0.4}Co_{0.8}Ni_{0.2}O_{3-d}$;
$La_{0.6}Sr_{0.4}Co_{0.6}Ni_{0.4}O_{3-d}$;
$La_{0.6}Sr_{0.4}Co_{0.4}Ni_{0.6}O_{3-d}$;
$La_{0.6}Ba_{0.4}Co_{0.8}Fe_{0.2}O_{3-d}$;
$La_{0.6}Sr_{0.4}Co_{0.8}Fe_{0.2}O_{3-d}$; and
$La_{0.6}Ca_{0.4}Co_{0.8}Fe_{0.2}O_{3-d}$;
wherein d=0 to 0.5.

In another aspect, the invention relates to a method of making a ceramic composition having a high adsorptive capacity for oxygen at elevated temperature, in which the composition comprises a material selected from the group consisting of:

$Bi_{2-y}Er_yO_{3-d}$;
$Bi_{2-y}Y_yO_{3-d}$;
$La_{1-y}Ba_yCo_{1-x}Ni_xO_{3-d}$;
$La_{1-y}Sr_yCo_{1-x}Ni_xO_{3-d}$;
$La_{1-y}Ca_yCo_{1-x}Ni_xO_{3-d}$;
$La_{1-y}Ba_yCo_{1-x}Fe_xO_{3-d}$;
$La_{1-y}Sr_yCo_{1-x}Fe_xO_{3-d}$; and
$La_{1-y}Ca_yCo_{1-x}Fe_xO_{3-d}$;
where
x is from 0.2 to 0.8,
y is from 0 to 1.0 and
d=0 to 0.9, wherein the method comprises forming a mixture of respective oxalates of the corresponding metals in the ceramic composition, and calcining the mixture to form the ceramic composition as a crytalline oxide.

The mixture of respective oxalates of the corresponding metals in the ceramic composition is advantageously formed by combining the corresponding metals with oxalate ion, with the oxalate ion being formed by heating glycolic acid. The glycolic acid in turn may be produced by reaction of nitric acid and ethylene glycol.

In yet another aspect, the invention relates to a method of making a lanthanum calcium cobalt metal oxide, LaCaCoMO, wherein the metal M is selected from the group consisting of iron and nickel, comprising the steps of:

(a) reacting nitric acid and ethylene glycol to yield glycolic acid;
(b) heating the glycolic acid to form oxalate ion;
(c) reacting the oxalate ion with the metals La, Ca, Co and M to form a mixture of oxalates of said metals; and
(d) calcining the mixture of oxalates of the aforementioned metals to yield the lanthanum calcium cobalt metal oxide, LaCaCoMO.

As used herein, the term "high adsorptive capacity" means an oxygen storage of at least 40 millimoles of oxygen per mole of the ceramic material when the ceramic material is contacted with oxygen gas at a temperature of 800° C.

As used herein, the term "elevated temperature" means a temperature in the range of from 400° C. to 1000° C.

When metal oxide ceramics are referred to herein in symbolic notational form without stoichiometric subscripts (e.g., in the term LaCaCoMO), it is to be understood that the respective elemental constituents are present in such material in stoichiometrically appropriate proportions relative to one another.

Additional objects, features and advantages of the invention will be more fully apparent from the ensuing disclosure and appended claims.

DETAILED DESCRIPTION OF THE INVENTION, AND PREFERRED EMBODIMENTS THEREOF

Figure 1:
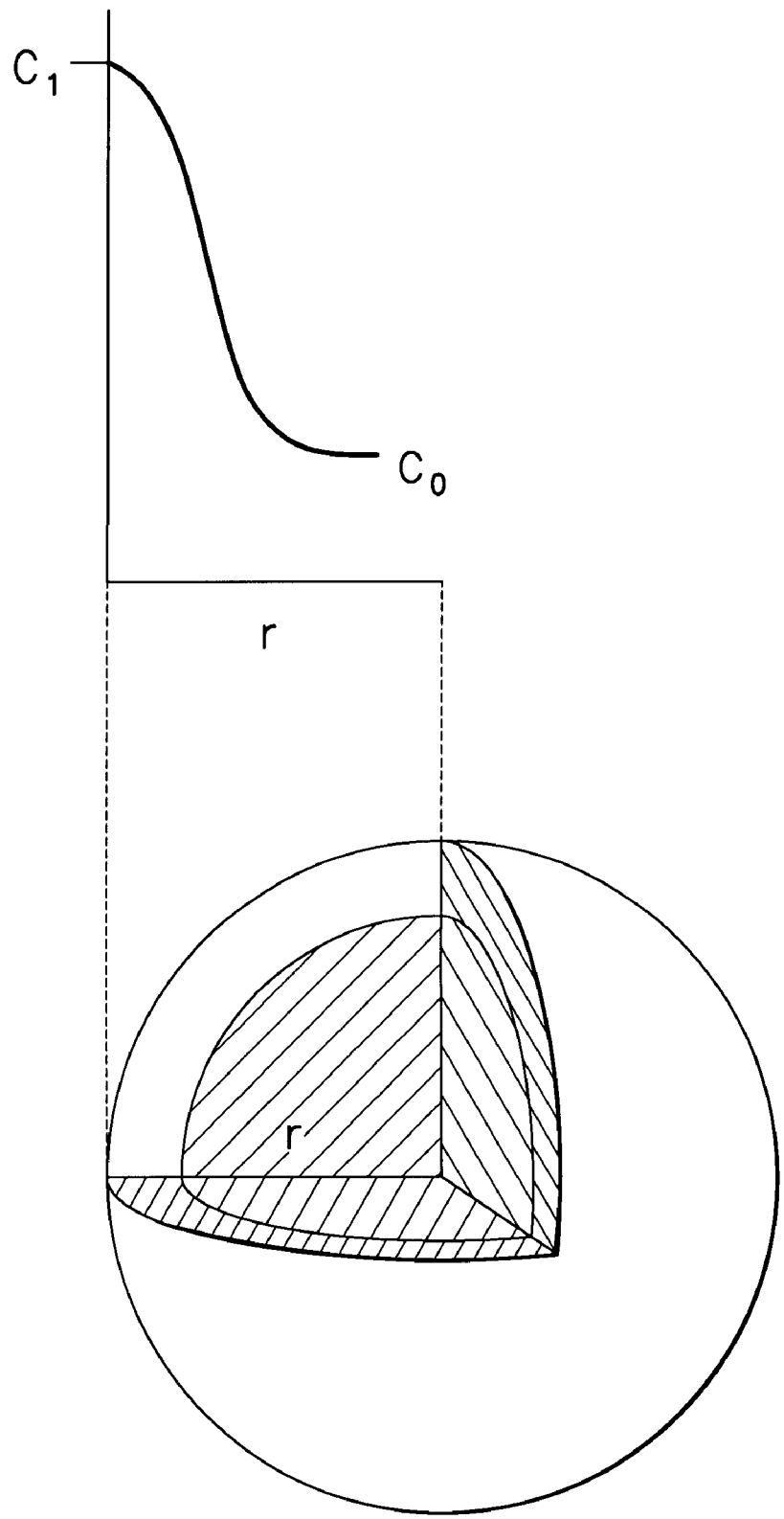
FIG. 1 is a schematic representation of a ceramic particle showing an associated concentration profile of oxygen as a function of radius of the particle.

Ceramic materials have been long known for their ability to dissociate oxygen molecules and transport ionic oxygen through their crystal lattice. All known efforts to exploit this phenomenon have focused on using the ceramic material as a separation membrane. However, the development of such membranes to a commercial scale is fraught with difficulties because of the inherent problems of using ceramics as structural members. The brittle nature of ceramics, e.g., their poor ductility, impact toughness and tensile/compressive characteristics, severely limit their use where tensile forces and thermal shock are encountered. As a membrane is subjected to high pressures and temperatures, typical failure modes of the membranes include thermal stress cracks, catastrophic failures, pinhole leaks, and failures that result from runaway thermal reactions on the surface of the membrane.

The present invention relates to ceramic compositions that are useful as a selective adsorption medium. Such ceramic compositions may be utilized as finely divided materials or as coatings on substrate elements to provide an adsorbent mass. The adsorbent mass may be deployed in a vessel through which an oxygen-containing feed gas mixture is flowed to remove oxygen from the gas mixture, e.g., as part of a pressure swing adsorption (PSA) system. Such usage of the ceramic material obviates the deficiencies described hereinabove for ceramic membranes.

In conventional ceramic membrane systems a ceramic material is used to transport oxygen ionically, using a ceramic material having a capacity for oxygen. But instead of using the ceramic material as a membrane physically separating oxygen from air, the ceramic material of the present invention may be used to temporarily store oxygen to effect separation during a pressure swing adsorption process. By eliminating the function of a "separating membrane," the development problems associated with scale-up, hot spots, thermal stresses, and manufacturing yields all disappear.

More specifically, the ceramic compositions of the present invention may be utilized as a ceramic ionic transport material in a pressure swing adsorption system to trap and deliver oxygen. Rather than use electricity to drive the transport of oxygen, as in conventional ceramic membrane separation processes, the ionic transport ceramic alone can act as an ionic oxygen storage medium.

In this manner, the ceramic compositions of the invention are ionic transport materials that may be employed as efficient "absorbents" with sole selectivity for oxygen. For example, by heating ceramic sorbent particles of the instant composition and maintaining same at elevated temperature, oxygen will be removed from an air stream flowed through a bed of such particles. Then, by reducing the pressure, the oxygen-deficient air stream can be removed, and oxygen can subsequently be liberated from the ceramic to yield a pure oxygen source. By this absorbent arrangement, oxygen is selectively and efficiently removed from the gas stream.

The ceramic compositions of the present invention enable the bulk separation and purification of oxygen based on ionic transport, in which the ceramic adsorbent is maintained at high temperature to temporarily store oxygen. Oxygen that contacts the surface of the ceramic adsorbent decomposes on the surface and is incorporated into the crystalline lattice of the ceramic material. While such process requires high temperatures, e.g., on the order of 600–900° C., the higher separation efficiency of oxygen from other (inert) gases in the oxygen-containing feed gas mixture is unexpectedly superior to conventional PSA approaches.

When the oxygen gas contacts the ceramic adsorbent, there is adsorption and dissociation of the oxygen, with charge transfer acting to cause penetrative flux of the oxygen species into the sorbent material particle. The chemical potential driving force is therefore employed to effect ionic transport of the oxygen species into the sorbent material.

The ceramic oxide adsorbent particles may be constituted by an inert substrate that is coated or otherwise associated with the ceramic material.

The ceramic adsorbent material of the present invention may be of any suitable size, shape and conformation appropriate to the end use application and the specific feed gas mixture involved in the oxygen adsorption use of the material. For example, the material may be in a finely divided form, e.g., beads, spheres, rings, toroidal shapes, irregular shapes, rods, cylinders, flakes, films, cubes, polygonal geometric shapes, sheets, fibers, coils, helices, meshes, sintered porous masses, granules, pellets, tablets, powders, particulates, extrudates, cloth or web form materials, honeycomb matrix monolith, composites (of the ceramic adsorbent with other components), or comminuted or crushed forms of the foregoing conformations.

The ceramic adsorbent materials of the invention may be formed by metalorganic chemical vapor deposition (MOCVD) on suitable supports or substrates, using appropriate precursors for the respective metal components of the metal oxide ceramic materials. Usage of MOCVD permits close control of stoichiometry and uniformity of coverage to be achieved. MOCVD permits films of multicomponent ceramics to be deposited with compositional reproducibility on the order of 0.1% and thickness uniformity of better than 5%.

Alternatively, the ceramic adsorbent material may be formed as bulk articles, e.g., particles, by conventional ceramic manufacturing techniques, such as powder metallurgy, slurry metallurgy (slip casting, tape casting, etc.) and coextrusion.

Another technique for forming the ceramic adsorbent utilizes sol gel techniques, which are particularly advantageous when the ceramic material is deposited on a carrier or inert substrate, such as a porous silica, alumina, kieselguhr, or the like. Sol gel techniques may be employed to make up a sol of the ceramic precursor and to spray, dip-coat, soak, roller coat, or otherwise apply the solution to the substrate, following which the mixed cation gel can be subjected to high temperature, e.g., calcined, to produce the desired ceramic material.

Sol gel techniques can also be used to form the ceramic as an unsupported article, such as in a fluidized calcining bed, or as formed on a lift-off substrate formed of or coated with a low surface energy coating to facilitate separation of the ceramic product from the lift-off substrate.

When MOCVD is employed for ceramics formation, the conventional approach for compositional control over a complex oxides is to introduce metal-organic precursors to the reactor via independently controlled manifolds, each requiring accurate control of temperature, pressure, flow rates and precursor concentrations. Besides its complexity, this method makes film stoichiometry highly sensitive to inaccuracies in any of these process variables. Films that are rich in specific metals will contain local non-stoichiometric phases or amorphous oxides that contribute to film inhomogeneity.

The use of MOCVD is successful in overcoming these composition control problems, as well as the difficulties encountered when moderate volatility precursors—often solids—need to be used. In the latter instance, the MOCVD process may employ either neat liquids or liquid solutions (if solid precursors are used) in a single mixture containing all the components desired in the film. Such "liquid delivery" therefore is an advantageous method of forming the ceramic adsorbent elements.

In forming films of the ceramic adsorbent material on substrate elements in the practice of the invention, individual precursors required for phase stability can be intimately mixed in a ratio that produces the desired film composition based on their respective deposition rates. Using liquid delivery the liquid sources are flash vaporized, thereby spending little time at the high temperature that leads to decomposition. Precursor compositions are commercially available for the metal species of the ceramic adsorbent compositions of the invention, e.g., Zr, Y, Sr, Bi, Fe, La, Co, Ca precursors, which are provided in liquid form as precursors suitable for liquid delivery MOCVD. Liquid delivery precursors of such type are commercially available from Advanced Technology Materials, Inc. (Danbury, Conn.) under the trademark EPIGRADE. Examples of such types of precursors include those disclosed in U.S. Pat. Nos. 5,453,494, 5,840,897, and 5,280,664, and U.S. patent application Ser. No. 08/484,654, now U.S. Pat. No. 6,110,529, the disclosures of which hereby are incorporated herein in their respective entireties.

Using the ceramic materials of the invention as absorbents in fixed bed PSA systems offers several advantages that currently hamper the development of such materials as membranes:

Reliability—Hot spots can develop in ceramic membranes as a result of exothermic recombination reactions on the surface of a nonuniform membrane. The hot spots then exhibit higher oxygen diffusion rates leading to runaway reactions and film failures. This problem can exist in newly manufactured membranes, and can develop in membranes exposed to many hours of use. By utilizing the ceramic adsorbent material in a PSA arrangement, pin holes, film uniformity, thermal expansion mismatches, and sealing problems no longer are relevant.

Easy Scale Up and Development—The active ceramic material in the present invention is not employed as a structural operational element where its physical integrity is important for function. Structural applications for ceramics are notorious for scale-up problems. With a fixed bed, scale-up is straightforward and economical. The components of the PSA equipment are well known and their reliability is proven.

Large Surfaces Areas—By properly choosing the particle size and porosity, the surface area of the ceramic adsorbent bed can be adjusted to maximize mass transport for specified pressure swings and diffusion distances.

High Purity Inert and Oxygen Streams—Because the ceramic adsorbent material has perfect selectivity for oxygen, both high purity oxygen and inert streams can be produced. Conventional air separation PSA utilizes the differences in quadrapole moments between nitrogen and oxygen for separation, and since argon does not have a quadrapole moment it is not separated from oxygen. As a ceramic sorbent will only absorb oxygen, the inert components such as nitrogen and argon are left behind in the gas processed by contacting with the ceramic sorbent, and do not contaminate the product gas.

Rather than use an electric potential to drive ceramic material membranes, the ceramic materials of the present invention may be deployed in a form that utilizes a concentration gradient to store oxygen. By having a pressure or concentration gradient over the material, a concentration profile is developed within the film. Whether the ceramic is a film or particle, in the presence of air at high temperature, oxygen will diffuse into the structure and create a compositional gradient as shown schematically in FIG. 1. Then by reducing the pressure or by using a vacuum, oxygen will diffuse from surface, thus providing a supply of pure oxygen.

A PSA process using the ceramic compositions of the present invention may be carried out at any suitable pressure levels in the respective adsorption ("loading" of the ceramic adsorbent) and desorption (releasing of oxygen from the ceramic adsorbent), as may be readily be determined within the skill of the art and without undue experimentation. The adsorption pressure may by way of illustration entail a pressure level on the order of from about 1.2 to about 10 atmospheres, and the corresponding desorption pressure may be in the range of from about −0.2 atmosphere to about 0.8 atmosphere, at a temperature that is appropriate to the process, feed gas mixture and oxygen product characteristics.

The temperature maintained in the PSA process in one preferred aspect of the invention may be on the order of from about 400° C. to about 900° C. The adsorbent beds may be maintained in a heated condition by any suitable heating or thermal energy input means, such as for example electrical resistance heating elements disposed in the adsorbent bed, jacketing of the adsorbent vessels of the PSA system with a suitable heat exchange fluid being flowed through the jacket to maintain the vessel and adsorbent bed contained therein at a selected temperature. Other means include elements, assemblies and subassemblies for effecting radiant heating, ultrasonic heating, microwave heating, convective heating, conductive heating (e.g., via extended surface elements such as fins in the interior volume of the adsorbent bed, coupled in heated relationship with a thermal energy source), heat exchangers, etc.

The adsorbent beds in the PSA process system may be suitably sized for any appropriate output of oxygen for the given oxygen-containing feed gas mixture that is processed in the system, and the appertaining cycle time. For example, the system may be sized to produce 120 standard cubic feet per minute (SCFM) of oxygen at 99.95% purity from an oxygen-nitrogen mixture, during a 2 minute PSA cycle.

The vessel containing the ceramic adsorbent bed may be constructed of any suitable material, such as a refractory metal. Alternatively, the vessel may be lined with an insulator material and heating elements may be incorporated on the inside of the vessel, to maintain the temperature of the bed at suitable elevated temperature.

The PSA process utilizing the ceramic compositions of the present invention differs from the usual PSA system in that the media has essentially perfect selectivity for oxygen, with no interaction with nitrogen or argon. In conventional PSA air separation systems using aluminosilicate zeolites, the zeolites show thermodynamic selectivity for nitrogen over oxygen. But since there is little difference between oxygen and argon, separation of these two gases is impractical with zeolites as an absorbent. Accordingly, oxygen-argon mixtures can be readily separated using the ceramic adsorbent materials of the present invention in a PSA system.

More broadly, such PSA systems may be advantageously employed to produce product gases such as oxygen, deoxygenated gases or gas mixtures (where the feed gas mixture undesirably contains oxygen), nitrogen (as the non-adsorbed gas from an oxygen-nitrogen mixture), etc. For example, a PSA system of such type may be employed to form "deoxo" gas, in which a 98% nitrogen stream containing oxygen is treated by the PSA process to yield a nitrogen gas product containing less than 100 parts per million by volume of oxygen.

Using ceramic materials as separation media requires high temperature, e.g., temperatures on the order of 800° C.

The ceramic adsorbent material may be coated in a thin film by MOCVD on an inert substrate, e.g., a particulate substrate, fibrous substrate, sheet or other substrate formed of a material such as active alumina, gamma alumina, tabular alumina or fused alumina. Alternatively, the coating of the substrate may be carried out by spray, sol gel, soak-and-bake, solution deposition, dipping, roller coating, or any other suitable technique. Such coated substrate bodies can be employed for pressure swing separation of oxygen-containing feed gas mixtures when such bodies are aggregated in a bed or mass with which the feed gas mixture is contacted at higher pressure, for subsequent release of the oxygen gas at lower pressure.

Various ionic transport electrolyte materials are identified in Table 1 below wherein surface exchange rates, diffusion coefficients, and most importantly, maximum storage capacities are set forth. As shown in the table, $La_{0.6}Ca_{0.4}Co_{0.8}Fe_{0.2}O_{3-\delta}$, with the highest surface exchange rate, has a theoretical storage capacity of 150 mmol $O_2$/mol at 800° C.

Figure 2:
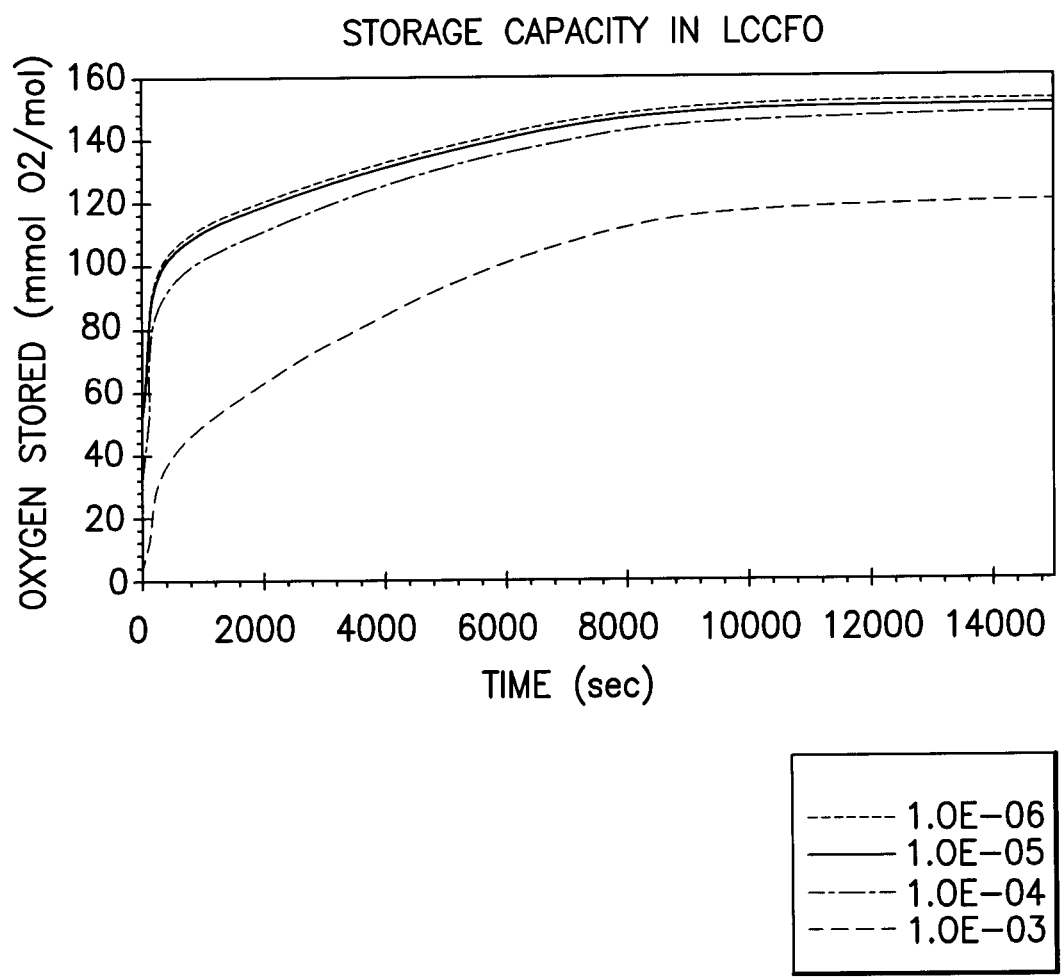
FIG. 2 is a graph of oxygen storage capacity as a function of time of exposure to the oxygen-containing feed gas mixture, for particles of ceramic adsorbent having different diameters.

FIG. 2 shows the theoretical oxygen storage capacity and rate response of this material for different sized particles. A storage capacity of about 100 mmol $O_2$/mol (1.6% weight gain) is shown for this material at a reaction time of around 10 minutes.

Figure 4:
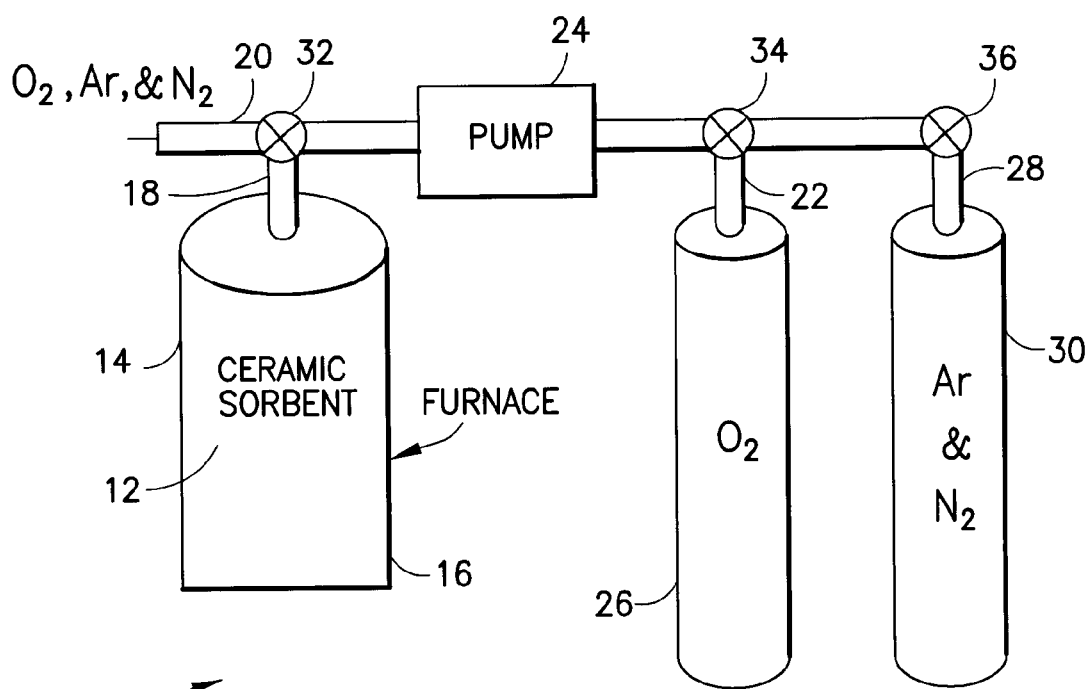
FIG. 4 is a schematic representation of a pressure swing adsorption system using a ceramic adsorbent according to one embodiment of the present invention.

A schematic representation of a vacuum pressure swing system 10 according to one embodiment of the invention is shown in FIG. 4.

TABLE 1

Experimental reported values for K and D, and some modeling results

| Composition | Temp. (° C.) | Surface Ex. Rate K (m/s) | Diffusion Coeff., D ($m^2$/s) | Max. Storage (mmol $O_2$/mol) | Vacancy % Filled in 100s |
|---|---|---|---|---|---|
| $Zr_{0.84}Y_{0.16}O_{2-d}$ — YSZ | 700 | $6 \times 10^{-11}$ | $2.5 \times 10^{-13}$ | 40 | 0.13 |
| YSZ — Bi Implanted | 700 | $1.6 \times 10^{-10}$ | $1.4 \times 10^{-12}$ | 40 | 0.15 |
| YSZ — Fe Implanted | 700 | $3.4 \times 10^{-10}$ | $3.3 \times 10^{-13}$ | 40 | 0.66 |
| $Bi_{1.55}Er_{0.45}O_{3-d}$ | 700 | $1 \times 10^{-7}$ | $4 \times 10^{-9}$ | 250 | 1.76 |
| $Bi_{1.5}Y_{0.5}O_{3-d}$ | 700 | $5 \times 10^{-9}$ | $9 \times 10^{-12}$ | 250 | 1.85 |
| $La_{0.6}Sr_{0.4}Co_{0.8}Ni_{0.2}O_{3-d}$ | 800 | $2 \times 10^{-8}$ | $1 \times 10^{-11}$ | 150 | 6.75 |
| $La_{0.6}Sr_{0.4}Co_{0.6}Ni_{0.4}O_{3-d}$ | 800 | $3 \times 10^{-8}$ | $6 \times 10^{-12}$ | 200 | 12.4 |
| $La_{0.6}Sr_{0.4}Co_{0.4}Ni_{0.6}O_{3-d}$ | 800 | $2 \times 10^{-8}$ | $7 \times 10^{-12}$ | 250 | 7.97 |
| $La_{0.6}Ca_{0.4}Co_{0.8}Fe_{0.2}O_{3-d}$ | 700 | $4 \times 10^{-8}$ | $2 \times 10^{-12}$ | 150 | 25.27 |
| $La_{0.6}Ca_{0.4}Co_{0.8}Fe_{0.2}O_{3-d}$ | 800 | $2 \times 10^{-7}$ | $1 \times 10^{-11}$ | 150 | 44.6 |
| $La_{0.6}Ca_{0.4}Co_{0.8}Fe_{0.2}O_{3-d}$ | 900 | $4 \times 10^{-7}$ | $3 \times 10^{-11}$ | 150 | 48.5 |

Increasing the oxygen vacancy in LaCaCoFeO compounds, through compositional modifications, was unsuccessful in improving their oxygen absorption capacity. Replacement of the Fe element with Ni was found, surprisingly, to enable the manipulation of composition and storage capacity.

Figure 3:
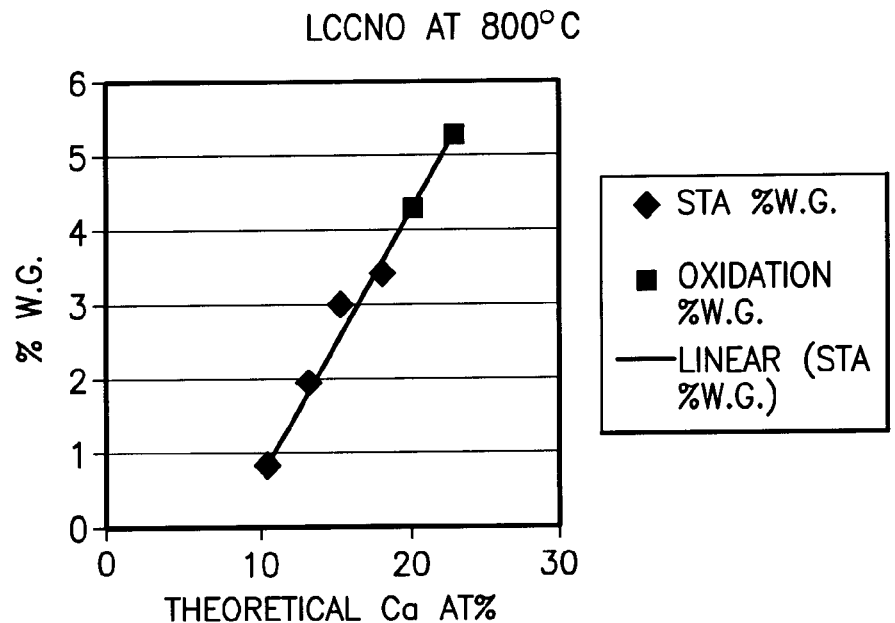
FIG. 3 is a graph of weight gains of the LaCaCoNiO perovskite oxide as determined by thermogravimetric analysis (TGA) and furnace oxidation at 800° C.

FIG. 3 shows the weight gains detected, through STA and furnace oxidation, on $La_{1-x}Ca_xCo_{0.8}Ni_{0.2}O_{3-\delta}$ compounds at 800° C. A 5.2% weight gain was achieved by the $CaCo_{0.8}Ni_{0.2}O_{0-67}$ compound.

Synthesis of LaCaCoNiO perovskite oxide materials may be carried out by a modified "Pechini" method, a liquid mixed technique, with ethylene glycol and nitrates used for the synthesis of LaCaCoNi oxide powders. A typical Pechini process involves the ability of certain weak acids (alphahydroxycarboxylic acid) to form polybasic acid chelates with various cations. These chelates can undergo polyesterification when heated in a polyhydroxyl alcohol to form a polymeric glass which has the cations uniformly distributed throughout the material.

Various cationic sources, such as carbonates, hydroxides, and alkoxides can also be used for the synthesis. Ethylene glycol reactions are similar to those of primary alcohols except for the presence of a hydroxyl group on each carbon. When cold nitric acid is added to the ethylene glycol, it oxidizes one of the alcohol groups giving glycolic acid. Heating the mixture yields oxalic acid, which is the simplest dibasic acid, comprising just two connected functional acidic carboxylic groups. Each carboxylic group loses a proton and forms oxalate ion. The oxalate ion $C_2O_4^{-2}$ functions as a bidentate chelate with a metal atom and forms a five-member chelate ring as shown below.

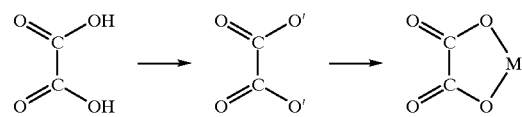

The majority of the elements in the Periodic Table form oxalate complexes. Because of the coordinating properties of the bidentate oxalate ion, most of the metals form complex oxalates in addition to simple oxalates. After the formation of these mixed cation gels, they are suitably calcined at elevated temperature, e.g., at 1080° C., to form crystalline oxide.

The system 10 includes a sorbent vessel 12 enclosing an interior volume containing a bed 14 of ceramic adsorbent material, in the form of finely divided solids particles of such material, or other material form, such as a bed of fibers coated with a ceramic adsorbent material. The vessel 12 is reposed in a furnace 16 which is operated to maintain a predetermined temperature environment in the firnace enclosure containing the vessel 12, so that the bed 14 of adsorbent material is maintained at temperature suitable for sorption of oxygen from an oxygen-containing gas mixture contacted with the bed, and for desorption of oxygen from the ceramic material at the low pressure (depressurized) condition of the PSA process when oxygen is released from the adsorbent and discharged from the PSA bed.

At its upper end, the vessel 12 is joined to a feed and dispensing conduit 18. The conduit 18 in turn is joined by three-way valve 32 to the main flow conduit 20.

The main flow conduit 20 has disposed therein a pump 24, which may be selectively actuated to flow gas from the bed 14 through the main flow conduit 20, either to the oxygen vessel 26 joined to the main flow conduit 20 by branch line 22 and associated three-way valve 34, or to the argon-nitrogen vessel 30 joined to the main flow conduit 20 by two-way valve 36.

In operation, air or other oxygen-containing feed gas mixture from a suitable source (not shown in FIG. 1) is flowed through the main flow conduit 20 with the valve 32 directing the flow through feed and dispensing conduit 18 into vessel 12. During such charging the furnace is actuated and maintains the ceramic adsorbent in a "hot" state appropriate to penetration of the oxygen into the sorbent particles of bed 14. When the bed has equilibrated, the interstitial void gas in the bed 14, comprising nitrogen and argon, and depleted in oxygen, is then pumped by pump 24 to the argon-nitrogen vessel 30, with valve 32 being switched to interconnect feed and dispensing conduit 18 with the downstream portion of main flow conduit 20, valve 34 being closed to flow into the branch line 22, and valve 36 being open to flow of gas from the main flow conduit 20 into branch line 28 and argon-nitrogen vessel 30.

The furnace 16 remains actuated, as valve 36 is closed to isolate the argon-nitrogen vessel 30, and valve 34 is opened to permit flow from the main flow conduit 20 to branch line 22. Pump 24 then acts to extract the oxygen gas from the vessel 12, as the ceramic adsorbent is maintained at a temperature allowing transport of the "trapped" oxygen from the sorbent bed particles into the voids of the bed. The oxygen gas then is flowed from vessel 12 through feed and dispensing conduit 18, main flow conduit 20, branch line 20 and into oxygen vessel 26.

After the adsorbent bed in vessel 12 has been extracted of the oxygen, valve 32 is switched and the feed gas mixture is again charged to the sorbent bed in vessel 12 as the furnace is maintained in operation to keep the adsorbent at suitable elevated temperature. Concurrently, valve 34 is switched to isolate oxygen vessel 26 and valve 36 is switched to open argon-nitrogen vessel 30 to flow of non-adsorbed gas thereinto, as the cycle is repeated.

In this manner, the system schematically shown in FIG. 4 may be sequentially, repetitively and cyclically operated to effect separation of air or other oxygen-containing feed gas mixture into oxygen-depleted and oxygen fractions for recovery thereof as described.

It will be apparent that the system shown schematically in FIG. 4 is illustrative only, and that the invention may be practice in other, multiple-bed arrangements, for continuous, semi-continuous, or batch operation, to separate the feed gas mixture involved. The heat flux may be maintained constant throughout the entire operation of the PSA process, or the temperature may be modulated during the process, as may be necessary or desirable in a given end use application of the present invention. For this purpose, the process system may employ suitable thermostatic, heat exchange or other temperature-controlling elements, such as thermosensors, temperature controllers, microprocessors, mass flow controllers, etc.

Figure 5:
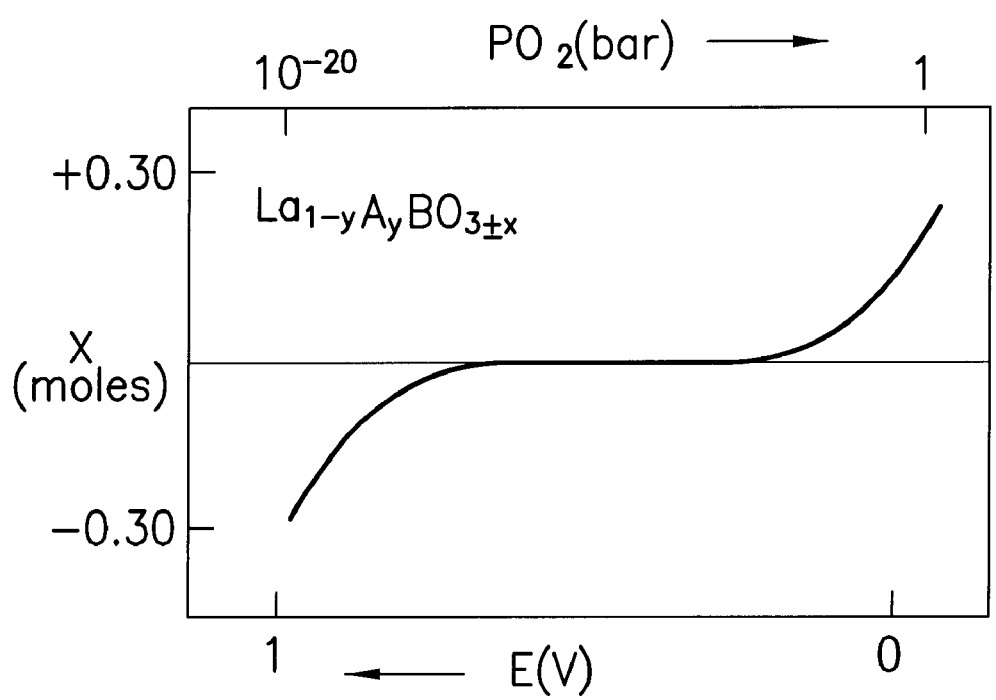
FIG. 5 is a graph of moles of oxygen retained in or removed from a crystal lattice of a ceramic adsorbent of a type advantageously employed in the use of the ceramic material of the invention, as a function of partial pressure of oxygen ($Po_2$ (bar)) or electrical potential imposed on the ceramic adsorbent (E(V)).

The PSA system uses ceramic compositions according to the invention that have the capacity to transport ionic oxygen. Molecular oxygen dissociates on the surface of the oxide ceramic and is then incorporated into the crystalline lattice. Potential gradients, for example in concentration, can cause the oxygen to move into and through the lattice. The imbalance in ions results in an electrical potential gradient across the material. In this manner, concentration and electrical gradients can be viewed as equivalent in terms of a driving force for oxygen transport. FIG. 5 shows this equivalence in terms of the moles of oxygen retained or removed from the lattice. Thus, pressure (concentration) is used to drive ionic oxygen into the ceramic adsorbent particles.

As an alternative to PSA processing of the oxygen-containing feed gas mixture, or in addition thereto, the ceramic adsorbent material could be deployed in a suitable form, e.g., corresponding particles in a bed of such material, and a voltage could be cyclically impressed on the bed, as modulated by suitable cycle timer means, to effect sorption and desorption of oxygen. The PSA process may therefore be conducted in a voltage-assisted manner, to achieve a desired efficiency of the separation process.

For example, the bed of ceramic particles may be disposed in a containment vessel containing a spaced-apart array of screen or grid electrode elements, containing ceramic adsorbent particles between the successive elements, and with the electrode elements alternatingly coupled to a voltage supply and ground, to provide a circuitry arrangement which can adsorb and then desorb the oxygen from an oxygen-containing gas.

FIG. 5 is a graph of moles of oxygen retained in or removed from a crystal lattice of a ceramic adsorbent, as a function of partial pressure of oxygen ($Po_2$ (bar)) or electrical potential imposed on the ceramic adsorbent (E(V)).

The ceramic adsorbent material is a metal borate material of the formula $La_{1-y}A_yBO_{3+x}$, wherein A may be a transition metal, y is from 0 to 1, and x is from 0 to 1. The performance of such metal borate ceramic is illustrative, and higher oxygen working capacities are achieveable by the ceramic compositions of the present invention.

The ceramic composition of the present invention is a ceramic oxide material through which only oxygen can diffuse. The composition of the ceramic oxide adsorbent material is such that a significant number of oxygen vacancies exist in the material. These oxygen vacancies facilitate the selective diffusion of oxygen through the material at relatively high rates. By placing either a voltage potential or a pressure gradient across the membrane, oxygen is selectively diffused in and through the oxide material. The oxide composition has the following features: 1) a high concentration of oxygen vacancies, 2) thermodynamic stability enabling operation at temperatures over 600° C., and 3) thermodynamic stability enabling operation under highly reducing conditions.

Figure 6:
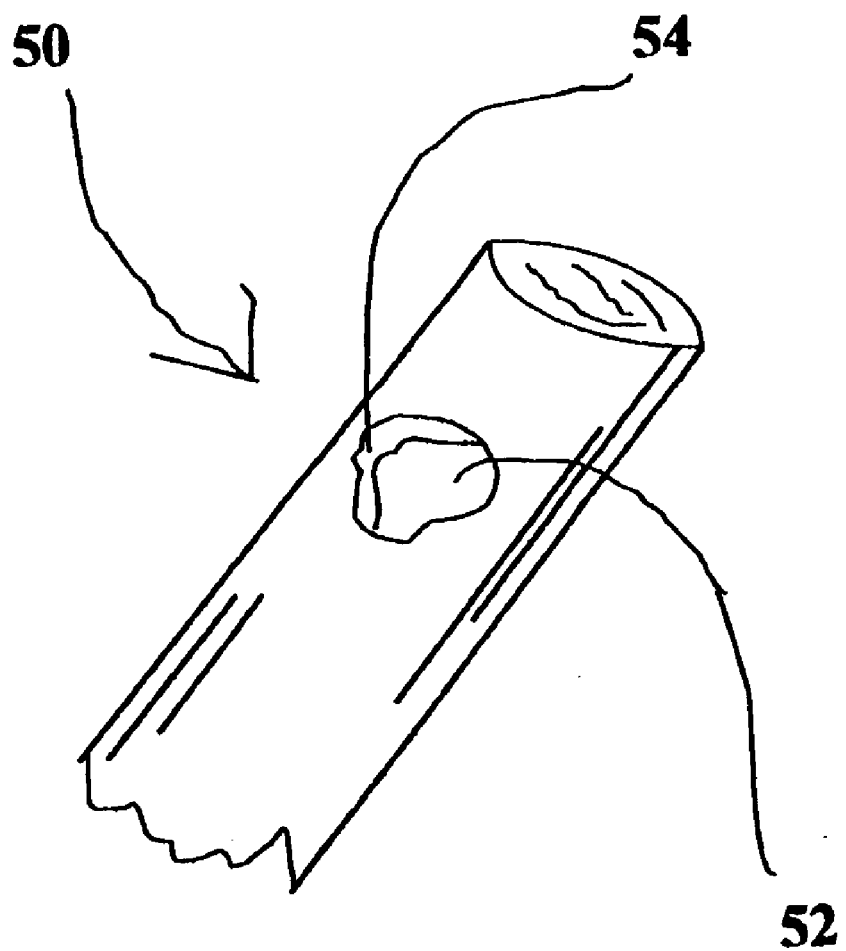
FIG. 6 is a perspective view of a coated fiber article including a fiber substrate coated with a ceramic adsorbent material according to one embodiment of the invention.

FIG. 6 is a perspective view of a coated fiber article 50 including a fiber substrate 52 coated with a ceramic adsorbent material 54 according to one embodiment of the invention. Coated fibers of such type may be employed in a bed of such fibers in a PSA process for extraction of oxygen from an oxygen-containing feed gas mixture. Alternatively, such fibers may be formed into woven or non-woven fibrous webs, that may likewise be employed in a PSA process for take-up of oxygen from an oxygen-containing feed gas mixture.

The fiber substrate 52 may be formed of a porous alumina material. The coating 54 may be an LCCFO material (LaCaCoFeO) deposited on the fiber substrate at a thickness on the order of 0.1 micrometer. Such coated fiber article may be readily formed by liquid delivery MOCVD techniques using suitable precursors for the lanthanum, calcium, cobalt, and iron components of the LCCFO film. An alternative coating material may comprise an LCCNO material (LaCaCoNiO).

Alternatively, the coated fiber article may be formed by sol gel techniques, or in any other suitable manner.

The PSA system utilizing ceramic composition of the invention embodies a highly efficient means and method for the extraction of oxygen from an oxygen-containing feed gas mixture, by contacting such feed gas mixture with the ceramic sorbent material having sorptive affinity for oxygen at elevated temperatures, such as in the range of 400° C.–1000° C. The PSA system may be configured in any suitable manner, with any appropriate number and size of beds for separation of oxygen from an oxygen-containing feed gas mixture. The PSA system may be controlled by suitable cycle timer units, e.g., integrated with computer control, to provide appropriate continuous, semi-continuous or batch operation.

Figure 7:
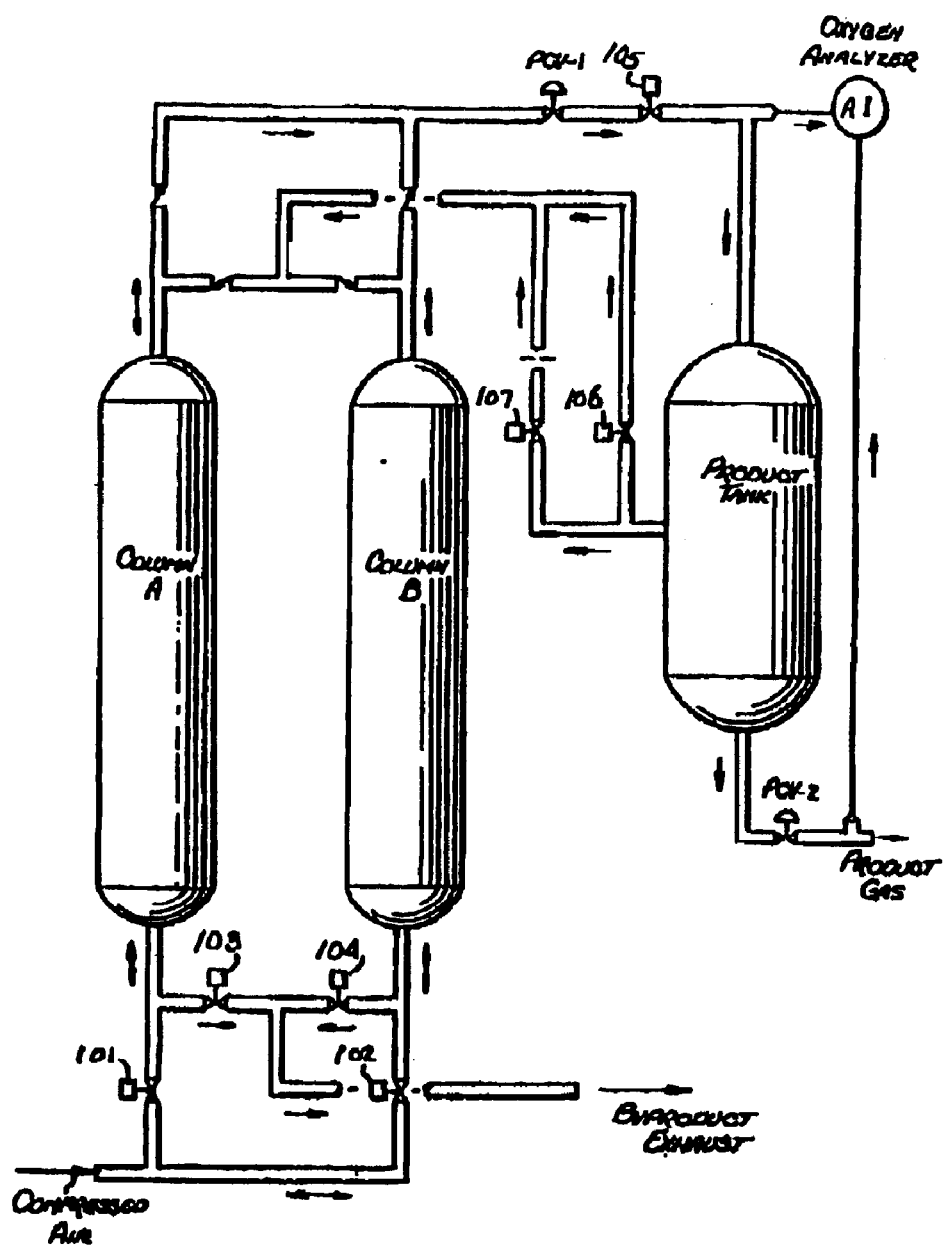
FIG. 7 is a simplified schematic representation of a multibed PSA system utilizing a ceramic adsorbent according to one embodiment of the invention.

FIG. 7 is a simplified schematic representation of a multibed PSA system 100 comprising two adsorbent vessels, A and B, each of which is filled with the ceramic adsorbent material, and employed for the production of nitrogen as a product gas, from an oxygen/nitrogen feed gas mixture.

The series of valves connecting the adsorbent vessels A and B may be defined by the number shown in the drawing and by the function performed in the following preferred arrangement:

| Valve(s) | Description |
| --- | --- |
| (a) Valves 101 and 102 | inlet air valves to adsorbent vessels "A" and "B" respectively. |
| (b) Valves 103 and 104 | depressurization valves |
| (c) Valve 105 | product flow valve from vessels "A" and "B" to the product tank |
| (d) Valve 106 | product gas repressurization valve from product tank to repressurizing vessel |
| (e) Valve 107 | product gas purge valve from product tank through the vessel under purge |
| (f) Valves PCV-1, PCV-2 | pressure reduction (back pressure control) valves. |
| (g) Check valves | control as flow directions. These are shown as arrows between the vessel connecting means. Gas flows in the direction of the arrow. |
| (h) Restriction orifice | shown above valve 107. Restricts gas flow for purge. |

The oxygen-containing feed gas mixture to be separated, e.g., air, is compressed and introduced into the system via either valve 101 or valve 102.

The feed gas mixture may be modified, prior to adsorption, by passing it through a dryer to remove excess humidity as a significantly reduced relative humidity may be preferred. Additionally, a filter or scrubber may be employed to remove other gases such as carbon dioxide or oxides of nitrogen. These steps improve the purity of the feed gas mixture.

Feed air is admitted to either vessel A or vessel B as a compressed gas via either valve 101 or valve 102 to selectively remove oxygen as the feed air flows cocurrently through the ceramic adsorbent. The PSA process will operate within a wide range of actual pressures, e.g., an adsorption pressure from the range of 3.0 to 8.0 bars in this embodiment. The elevated temperature process condition in the adsorbent vessels is maintained by suitable heating means (not shown in FIG. 7), which maintain the temperature of the sorbent beds in the respective vessels at a level on the order of from about 700–900° C. Nitrogen product gas is discharged from column A, for example, through valve PCV-1, via valve 105 and is collected in the product tank. The product nitrogen gas oxygen concentration may be analyzed upstream of the product tank as a measure of instantaneous product gas purity, or downstream of the product tank as a measure of average product gas purity. A flow of product gas is discharged from the product tank at a constant pressure somewhat lower than the minimum pressure of the product tank. This is accomplished via pressure reducing valve PCV-2.

Each adsorbent vessel is cycled through adsorption, partial equalization, depressurization, purge, product repressurization and feed repressurization steps. One system cycle is defined as the completion of these steps for both columns.

At the conclusion of each vessel's adsorption cycle, the nearly spent adsorbent vessel is partially vented at its inlet (or bottom) and the vented gas is passed to the bottom (or inlet) of the column to be repressurized. This partial venting occurs substantially simultaneously with the cocurrent feed gas repressurization of the column being regenerated for adsorption by opening valves 101 and 102.

Following this partial "bottoms" equalization step, the nearly spent adsorbent vessel, B, is isolated and is totally depressurized to atmospheric pressure at its inlet via valve 104 thereby desorbing and exhausting quantities of byproduct exhaust, i.e., adsorbed oxygen. The vented column is then countercurrently swept with 0.1 to 1.0 bed volume of product gas at a controlled flow from the product tank introduced via valve 107 to purge the adsorbent vessel of additional residual and adsorbed oxygen via valve 104. The isolated adsorbent vessel B is then partially regenerated by repressurizing with product gas from the product tank via valve 6 to from 10% to 30% of the adsorption pressure.

Final repressurization of the regenerated adsorbent vessel is accomplished by the substantially simultaneous introduction of vented gas from the bottom of the column, which has completed its adsorption cycle, and compressed feed air, via open valves 101 and 102 until from 40% to 80% of the adsorption pressure is reached, after which valve 101 is closed.

The system cycle is continuously repeated alternatively using one column for the production of enriched nitrogen while the second column is regenerated and repressurized.

The features and advantages of the invention are more fully shown with reference to the following non-limiting example, wherein all parts and percentages are by weight, unless otherwise expressly stated.

EXAMPLE I

A PSA system including an adsorbent bed containing LCCFO ceramic material is arranged with an upstream heat exchanger and is employed to produce nitrogen at high purity.

Influent air is passed through the heat exchanger in countercurrent flow with nitrogen-rich product gas discharged from the adsorbent bed. The resultantly heated influent air stream flows from the heat exchanger to the adsorbent bed and oxygen is removed therefrom by the adsorbent in the bed, with the bed being heated by suitable means. In the depressurized state after active removal of oxygen from the air contacted with the adsorbent, the oxygen is pumped from the bed by a pump arranged downstream from the adsorbent bed and discharged from the system for packaging, transport and/or end use.

The influent air stream has a mole fraction composition of oxygen, 20.9 mol. %, nitrogen, 78 mol. %, argon, 1.0 mol. % and carbon dioxide, 0.10 mol. %. This stream is at a temperature of 25° C. and a pressure of 50 psia. The temperature of the adsorbent bed is at 800° C.(alternatively, a value in the range of from about 600° C. to about 900° C. may be usefully employed). The feed air stream is heated in the heat exchanger upstream of the adsorbent bed to a temperature of 483° C. and is at a pressure of 100 psia.

The nitrogen-rich gas yielded by the adsorption of oxygen from the feed air mixture and discharged from the adsorbent bed is at a temperature of 800° C. and a pressure of 130 psia. After passage of the nitrogen-rich gas through the countercurrent heat exchanger, the nitrogen-rich gas is discharged from the process system at a pressure of 50 psia and a temperature of 200° C.

The oxygen-rich gas released from the adsorbent bed during the low pressure step of the PSA process is at a pressure of 0.5 psia and a temperature of 800° C. The final oxygen-rich gas discharged from the downstream pump is at a pressure of 1 psia.

The oxygen-rich gas contains 96.32 mol. % oxygen, 3.63 mol. % nitrogen, 0.05 mol % argon, and no carbon dioxide.

The product nitrogen-rich gas contains 98.35 mol. % nitrogen, 0.27 mol. % oxygen, 1.26 mol. % argon, 0.13 mol. % carbon dioxide. The product nitrogen-rich gas may be employed for inerting applications, blanket gas, sparging gas, or other commercial inert gas applications.

EXAMPLE II

A ceramic adsorbent sol gel was employed to coat an alumina fiber mat using soak-and-bake or spray techniques.

Usage of the solid fiber mat substrates offers several advantages, including reduction of pressure drop and maximum usage of the ceramic adsorbent medium. By coating the ceramic adsorbent medium on porous alumina substrates, an oxygen diffusion distance of 80 micrometers was achieved at 800° C.

While the invention has been illustratively described herein with reference to various embodiments and disclosed features, it will be appreciated that the invention is not thus limited, but rather extends to and encompasses numerous variations, modifications and other embodiments. Accordingly, the invention is intended to be broadly construed and interpreted as including all such variations, modifications and other embodiments within the spirit and scope thereof, as hereinafter claimed.

What is claimed is:

1. A ceramic composition having a high adsorptive capacity for oxygen at elevated temperature, said composition comprising $La_{1-y}Ba_yCo_{1-x}Ni_xO_{3-d}$, wherein x is from 0.2 to 0.8, $0<y\leq1$ and d is 0.1 to 0.9.

2. A ceramic composition having a high adsorptive capacity for oxygen at elevated temperature, said composition comprising $La_{0.6}Sr_{0.4}Co_{0.4}Ni_{0.6}O_{3-d}$.

3. A ceramic composition having a high adsorptive capacity for oxygen at elevated temperature, said composition comprising a material selected from the group consisting of:

$Bi_{1.55}Er_{0.45}O_{3-d}$; and $Bi_{1.5}Y_{0.5}O_{3-d}$;

wherein d=0.5 to 0.9.

4. A method of making a ceramic composition having a high adsorptive capacity for oxygen at elevated temperature, said composition comprising a material selected from the group consisting of:

$Bi_{2-y}Er_yO_{3-d}$;

$Bi_{2-y}Y_yO_{3-d}$;

$La_{1-y}Ba_yCo_{1-x}Ni_xO_{3-d}$;

$La_{1-y}Sr_yCo_{1-x}Ni_xO_{3-d}$; and $La_{1-y}Ca_yCo_{1-x}Ni_xO_{3-d}$;

wherein x is from 0.2 to 0.8, $0<y\leq1$ and d=0.1 to 0.9, wherein said method comprises;

combining nitric acid and ethylene glycol to form a glycolic acid solution; heating said glycolic acid solution to form oxalate ion;

combining the oxalate ion with corresponding metals to form respective oxalates of the corresponding metals;

mixing said respective oxalates of the corresponding metals to form an oxalates mixture; and calcining the mixture to form said ceramic composition as a crystalline oxide.

5. A method of making a lanthanum calcium cobalt metal oxide, $La_{1-y}Ca_yCo_{1-x}Ni_xO_{3-d}$, comprising the steps of:

(e) reacting nitric acid and ethylene glycol to yield glycolic acid;

(f) heating the glycolic acid to form oxalate ion;

(g) reacting the oxalate ion with the metals La, Ca, Co, and M to form a mixture of oxalates of said metals; and (h) calcining the mixture of oxalates of said metals to yield the lanthanum calcium cobalt metal oxide, $La_{1-y}Ca_yCo_{1-x}Ni_xO_{3-d}$ wherein x is from 0.2 to 0.8, $0<y\leq1$, and d=0.1 to 0.9.

6. A ceramic composition having a high adsorptive capacity for oxygen at elevated temperature, said composition comprising a material selected from the group consisting of:

$Bi_{2-y}Er_yO_{3-d}$; and $Bi_{2-y}Y_yO_{3-d}$;

wherein x is from 0.2 to 0.8, y is from 0 to 1.0 and d=0.5 to 0.9.

7. The ceramic composition of claim 6, comprising $Bi_{2-y}Er_yO_{3-d}$.

8. The ceramic composition of claim 6, comprising $Bi_{2-y}Y_yO_{3-d}$.

9. A ceramic composition having high adsorptive capacity for oxygen at elevated temperature, said composition comprising $CaCo_{0.8}Ni_{0.2}O_{2.4}$.

10. A ceramic composition having a high adsorptive capacity for oxygen at elevated temperature, said composition comprising $La_{1-y}Ca_yCo_{1-x}Ni_xO_{3-d}$ wherein y is from 0.6 to 1.0.

* * * * *